US005224766A

United States Patent [19]

Oikawa et al.

[11] Patent Number: 5,224,766

[45] Date of Patent: Jul. 6, 1993

[54] ANTI-SKID CONTROL APPARATUS FOR A VEHICLE BRAKING SYSTEM

[75] Inventors: Hirotaka Oikawa; Toshio Takayama, both of Yamanashi, Japan

[73] Assignee: Tokico Ltd., Kanagawa, Japan

[21] Appl. No.: 789,049

[22] Filed: Nov. 7, 1991

[30] Foreign Application Priority Data

Nov. 9, 1990 [JP] Japan ..... 2-304929
Nov. 9, 1990 [JP] Japan ..... 2-304930

[51] Int. Cl.[5] ..... B60T 8/34

[52] U.S. Cl. ..... 303/100; 303/105; 303/113.5

[58] Field of Search ..... 303/100, 105, 106, 95, 303/110, 93, 113 AP, 9.62

[56] References Cited

U.S. PATENT DOCUMENTS 3,918,766 11/1975 Klatt ..... 188/181 R
4,313,166 1/1982 Rode et al. ..... 303/105
4,657,310 4/1987 Klein ..... 303/100
4,740,040 4/1988 Arikawa ..... 303/100
4,790,607 12/1988 Atkins ..... 303/100
4,836,620 6/1989 Arikawa ..... 303/105
4,865,396 9/1989 Sato ..... 303/100
4,943,123 7/1990 Takeda et al. ..... 303/100

FOREIGN PATENT DOCUMENTS 1421634 1/1976 United Kingdom .

*Primary Examiner*—Matthew C. Graham
*Attorney, Agent, or Firm*—Biebel & French

[57] ABSTRACT

The present invention related to an improved antiskid control apparatus. When the front wheel on either the right and left sides becomes subject to antiskid control, this apparatus detects whether or not the road surface has a split $\mu$ condition in which the road surface friction coefficient at the right and left wheels differs by more than a prescribed value. When the road surface is determined to be in a split $\mu$ condition, the braking power for the rear wheels is lowered stepwise during antiskid control to suppress spinning and secure a large side force. This side force cancels the yaw moment which is generated by the difference of friction coefficients in the running direction on the right and left wheels.

20 Claims, 14 Drawing Sheets

ANTI-SKID CONTROL APPARATUS FOR A VEHICLE BRAKING SYSTEM

BACKGROUND OF THE INVENTION

The present invention relates to an antiskid control apparatus and more specifically an antiskid control apparatus that improves stability under split $\mu$ road surface conditions where the coefficients of friction of the road surfaces, upon which the right and left wheels make contact, differ greatly from one another.

PRIOR ART

Antiskid control apparatuses that prevent wheel lock during vehicle braking are known in the art and have been previously disclosed, for example, in Japanese Patent Application, 2nd publication, No. 56-28738 and No. 59-19863.

In the antiskid control apparatuses disclosed therein, the presence or absence of the tendency for each wheel to lock is based upon the measured value of the wheel speed, and the locking of any wheel is prevented by controlling the rise in the fluid pressure of the hydraulic piping system of the wheel.

As a result of ice on one portion of a road the friction coefficient of the road surface with which the right wheel makes contact differs greatly from that with which the left wheel makes contact. In such a case, countermeasures are taken against vehicular spin caused by an unequal braking force between these two wheels. That is, the rise in the brake fluid pressure of the wheel opposing the paired wheel which is antiskid-controlled (for example, the right front wheel opposing the left front wheel, or the right rear wheel opposing the left rear wheel) is controlled and a sudden occurrence of the yaw moment, which causes the spin, is controlled. In this manner, the driver is allowed a steering margin ensuring driving stability.

The above-mentioned spin countermeasures have been developed primarily for full-sized vehicles (in general, long wheelbases are best-suited to nonswerving forward motion during braking). Therefore, a problem that remained was that antiskid apparatuses could not be directly applied to compact vehicles though the tendency is to equip these vehicles with antiskid control apparatuses in recent years.

In general, compact vehicles which have short wheelbases are inferior in nonswerving forward motion during braking when compared with full-sized vehicles that have long wheelbases. In addition, the load on the rear wheels of compact vehicles, that have an important role in maintaining direct nonswerving forward motion, is low. As a result, in the above-mentioned conventional antiskid control, there are situations where spin countermeasures achieved by just lowering the speed at which the yawing moment occurs cannot ensure sufficient driving stability.

SUMMARY OF THE INVENTION

The object of the present invention is to provide reliable antiskid control which ensures driving stability under split $\mu$ road surface conditions regardless of the type or size of vehicle to which it is applied.

In order to accomplish the above-mentioned object, in an antiskid control apparatus which is provided with wheel-speed sensors which detect the speed of each wheel, a modulator which selects and sets one of three modes—an increase pressure mode which raises the brake fluid pressure of each wheel, a decrease pressure mode which controls the increase in brake fluid pressure, and a hold mode—and a controller which, by determining whether or not the wheel speed data detected by one of the wheel speed sensors exceeds a prescribed threshold value, determines whether or not the corresponding wheel is going to lock and, if so, controls the mode of the modulator in such a manner that the antiskid control is initiated by setting either the decrease pressure mode or the hold mode to control the increase in brake fluid pressure of the wheel that is going to lock; the controller is characterized in being equipped with a split $\mu$ detector which, when the front wheel on either the right or left sides is antiskid controlled, detects whether or not there exists a road surface condition of split $\mu$ in which the friction coefficients of the road surface in contact with the right and left wheels differ from each other by a prescribed value or more, and a braking power controller which, upon detecting the condition of split $\mu$ by means of the split $\mu$ detector, decreases the braking power of the rear wheels continuously during antiskid control.

In a split $\mu$ condition where the wheel on either one of the right and left sides makes contact with a low $\mu$ road surface and the wheel on the other side makes contact with a high $\mu$ road surface, when the front wheel on the former side has a tendency to lock, and the antiskid control is initiated and, at the same time, the split $\mu$ road condition is detected, decreasing the braking power of the rear wheel, to suppress spin generation, and decreasing the braking force of the rear wheel continuously during antiskid control to ensure a large side force. This side force can cancel the yaw moment generated by the difference in friction coefficients in the forward direction between the right and left wheels and thereby prevent the vehicle from spinning. This spin prevention effect is especially large when there is a large side force on the rear wheel during a braking operation in which the center of gravity is shifted forward.

A BRIEF DESCRIPTION OF THE FIGURES

FIG. 1 is a control flowchart on spin prevention.

FIGS. 2(*a*), 2(*b*), 2(*c*), 2(*d*) and 2(*e*) shows changes in wheel speed, front wheel braking pressure, rear wheel braking power, split $\mu$ counter, and the threshold pressure when depressurizing the rear wheel during the control.

FIGS. 3(*a*), 3(*b*), 3(*c*) and 3(*d*) shows changes in wheel speed, front wheel braking pressure, split $\mu$ counter, and the threshold pressure when depressurizing the rear wheel in cases where the braking pressure's rate of increase is different between the right and left wheels.

Figure 6A:
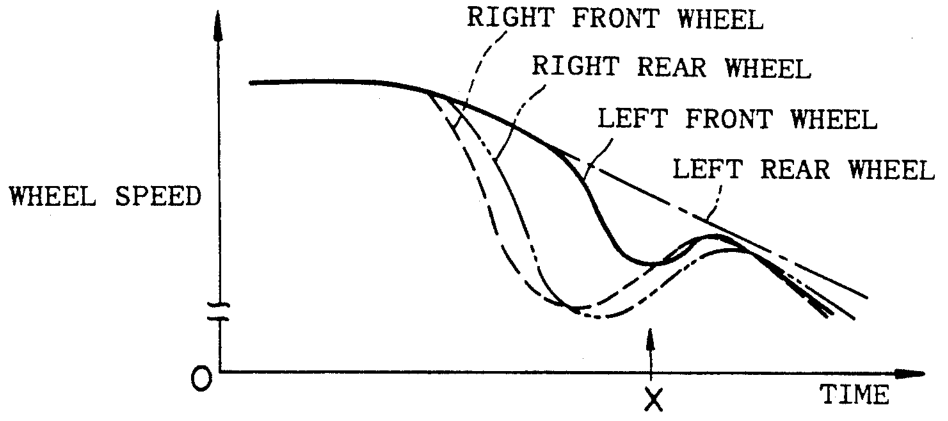
Figure 6B:
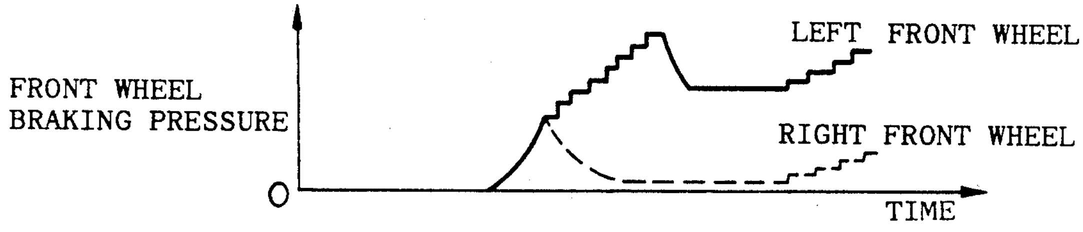
Figure 6C:
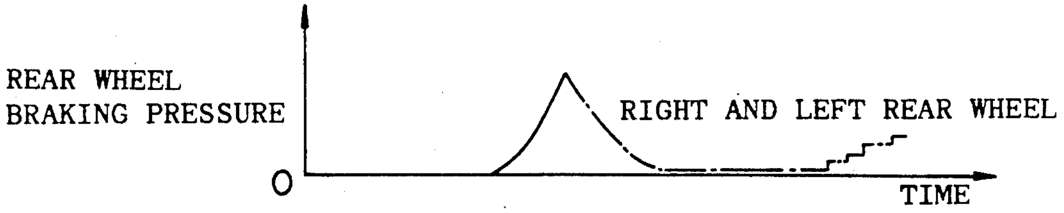

FIGS. 6(*a*), 6(*b*) and 6(*c*) shows the changes in wheel speed, front wheel braking pressure, and rear wheel braking pressure each during antiskid control by means of conventional apparatus.

Figure 7:
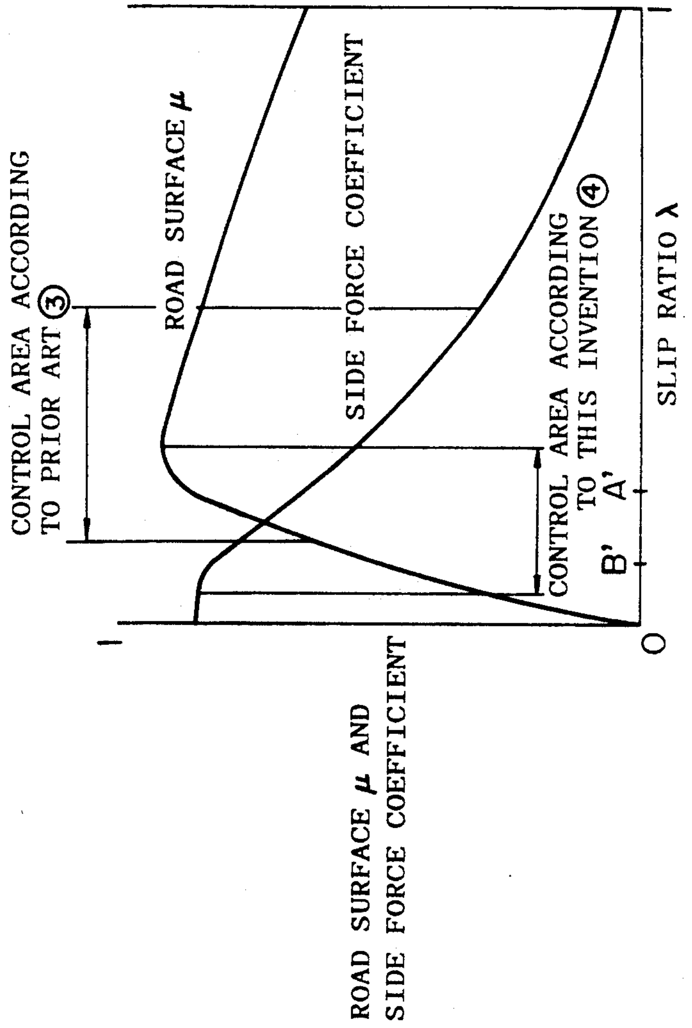

FIG. 7 shows the relationship of coefficients of road surface friction and side force to slip ratio.

Figure 8:
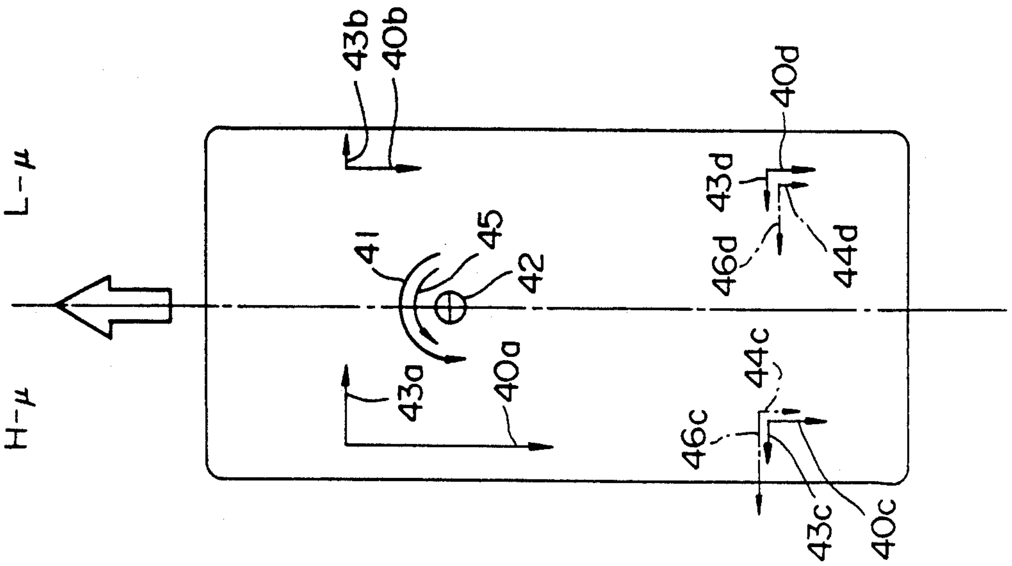

FIG. 8 is a diagram showing the relationship between the yaw moment acting on a vehicle during braking and the side force working against it.

Figure 9:
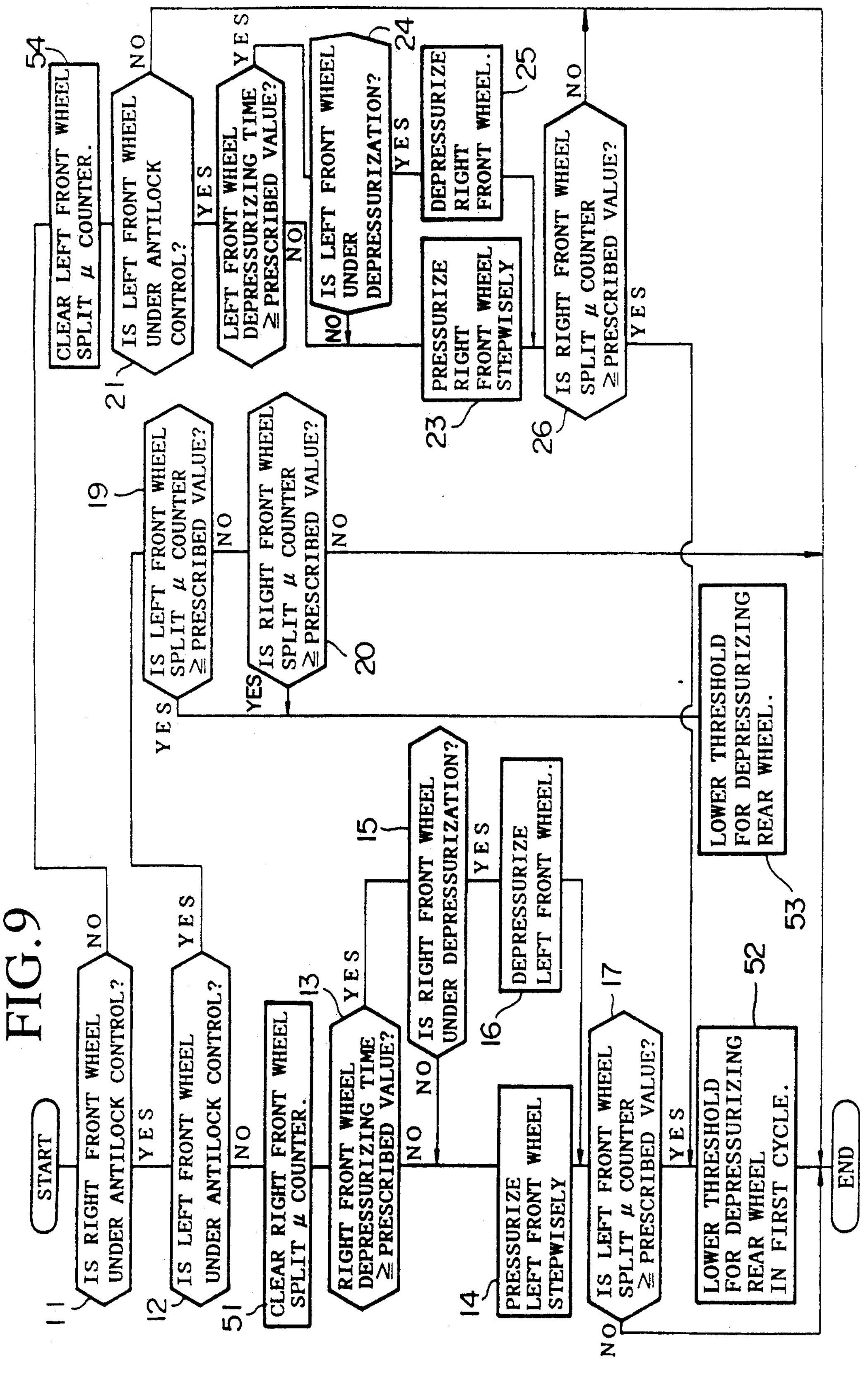

FIG. 9 is a flowchart showing control in the second embodiment according to the present invention.

Figure 10:
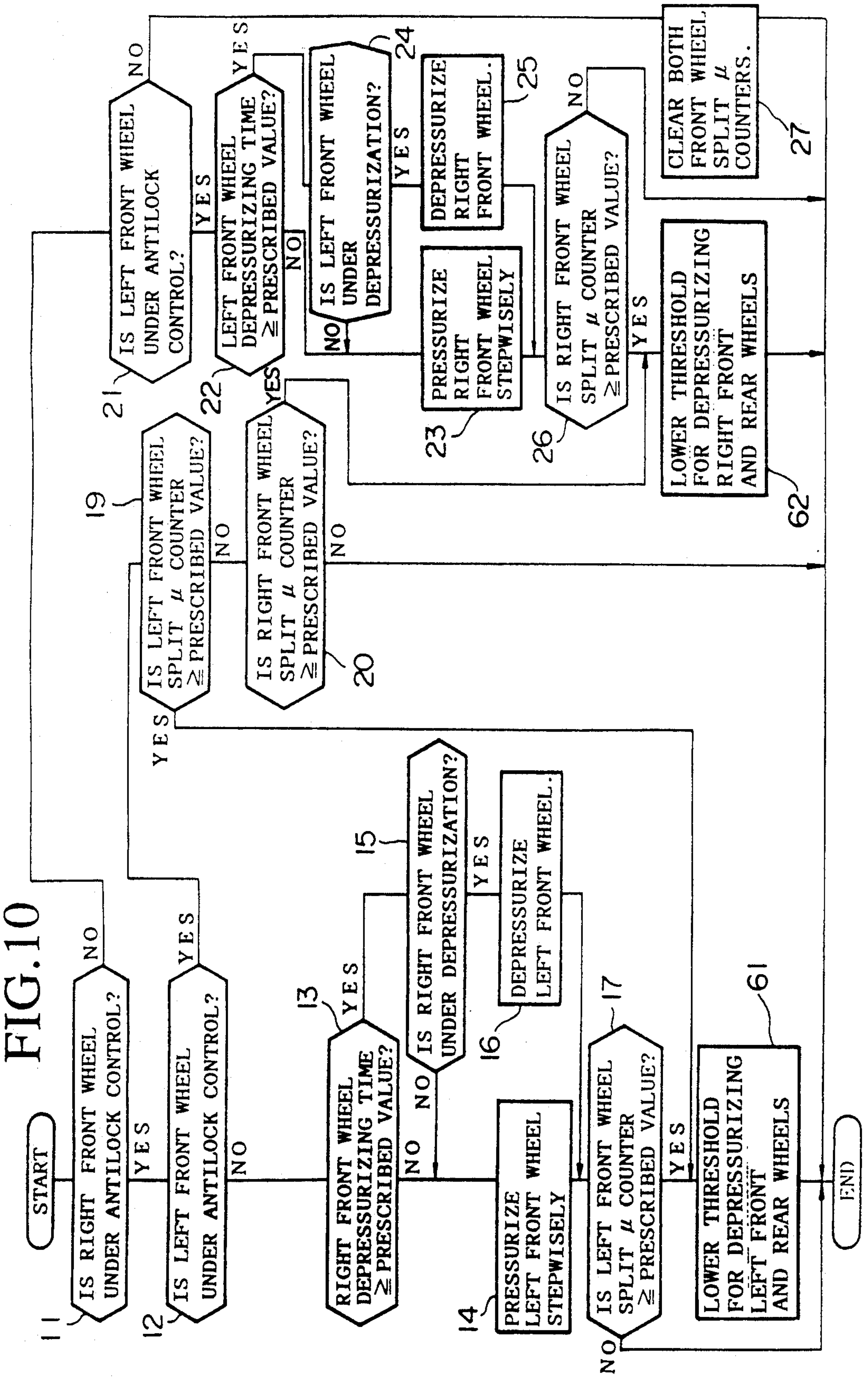
Figure 11A:
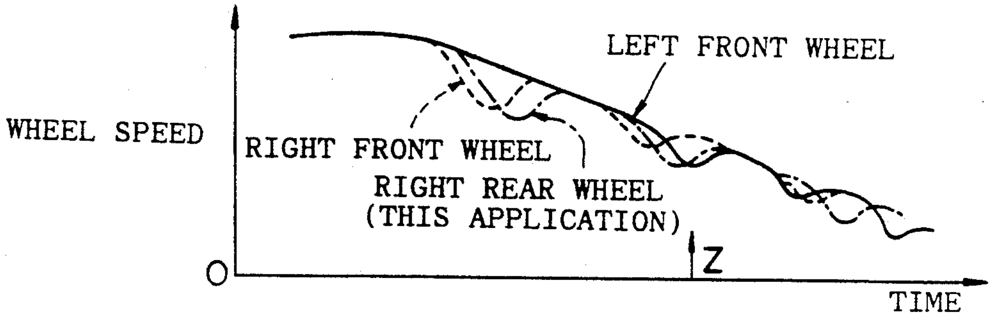
Figure 11B:
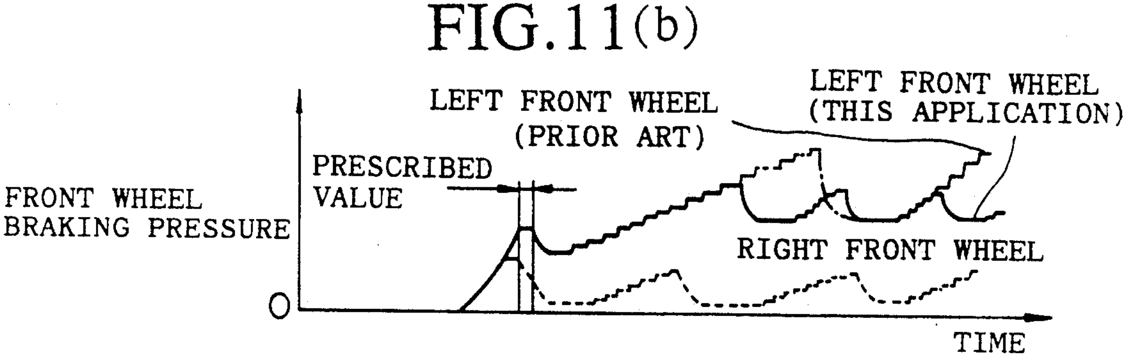
Figure 11C:
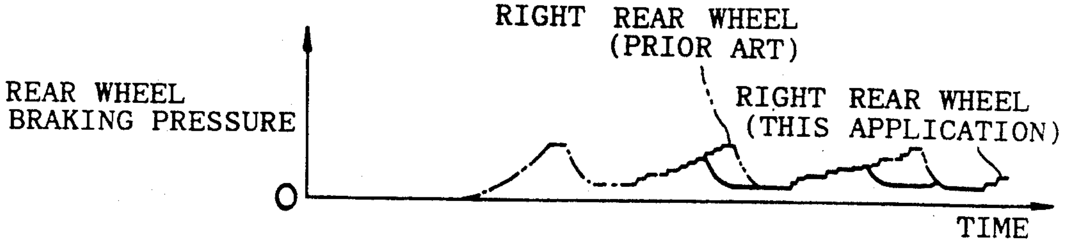
Figure 11D:
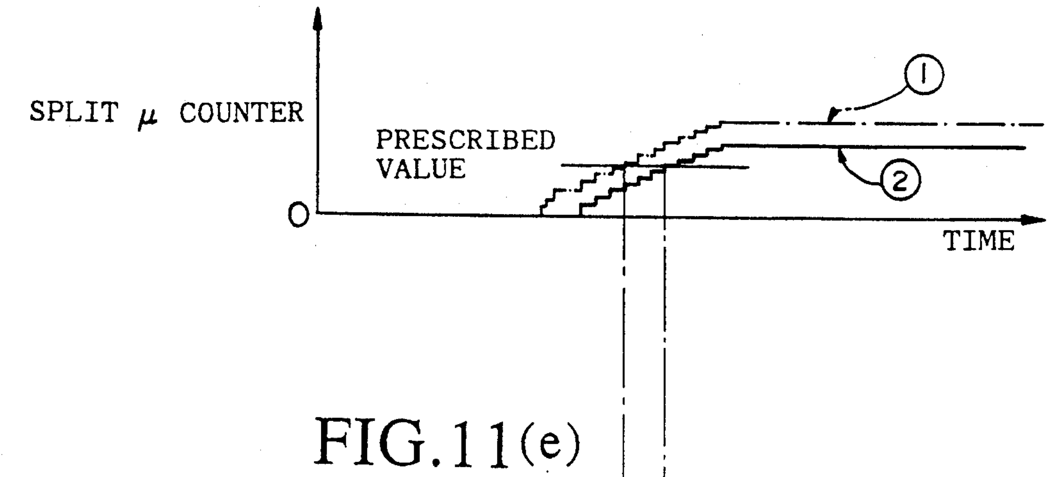
Figure 11E:
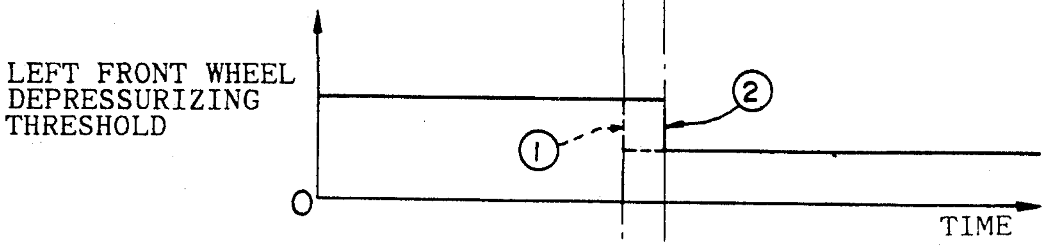
Figure 11F:
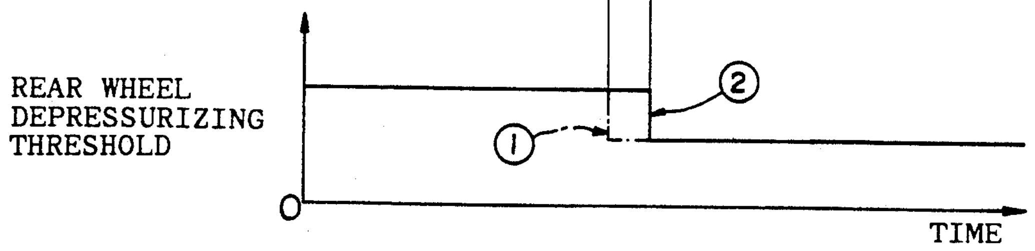

FIG. 10 is a control flowchart of the third embodiment of the present invention.

FIGS. 11(*a*), 11(*b*), 11(*c*), 11(*d*), 11(*e*) and 11(*f*) changes in wheel speed, front wheel braking power, rear wheel braking power, split $\mu$ counter, threshold pressure when depressurizing the left front wheel, and threshold pressure when depressurizing the rear wheel.

Figure 12:
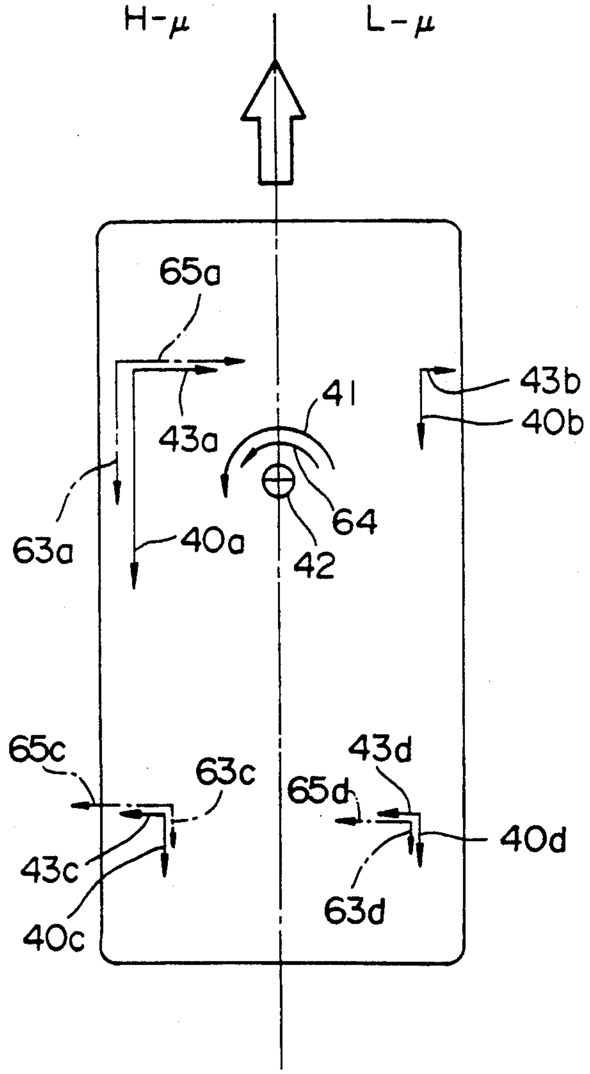

FIG. 12 is a plan view similar to FIG. 8 in the third embodiment.

Figure 13:
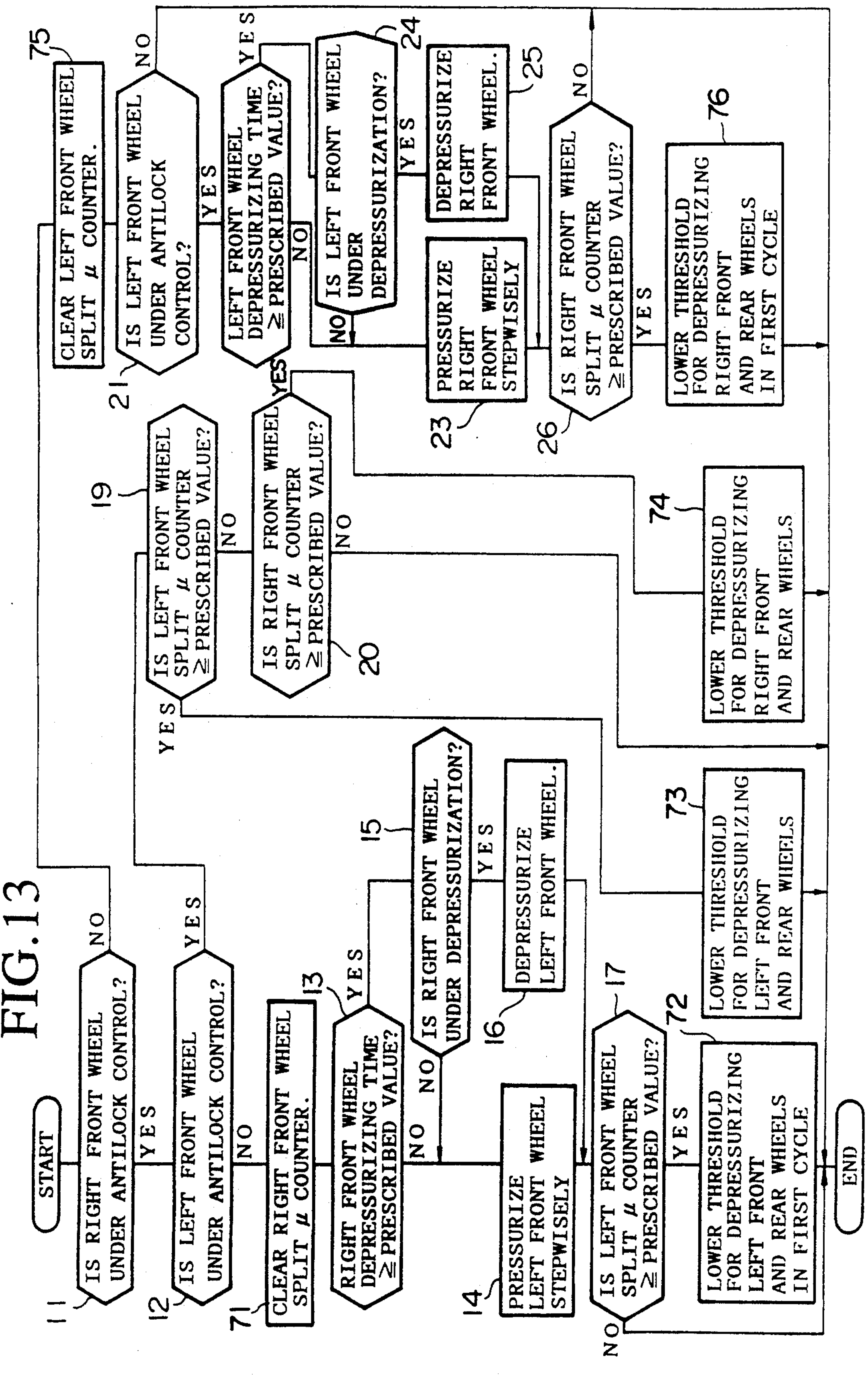

FIG. 13 is a flowchart of the fourth embodiment of the present invention.

DESCRIPTION OF THE EMBODIMENTS

Hereinafter, embodiments in accordance with the present invention will be explained with reference to the figures.

Figure 4:
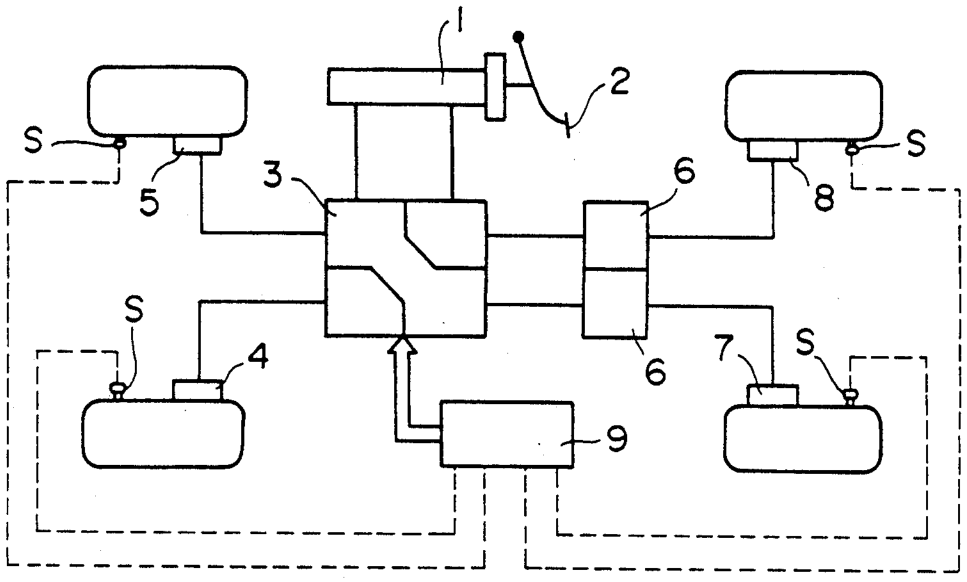
FIG. 4 is a piping diagram showing the brake fluid pressure system.
Figure 5:
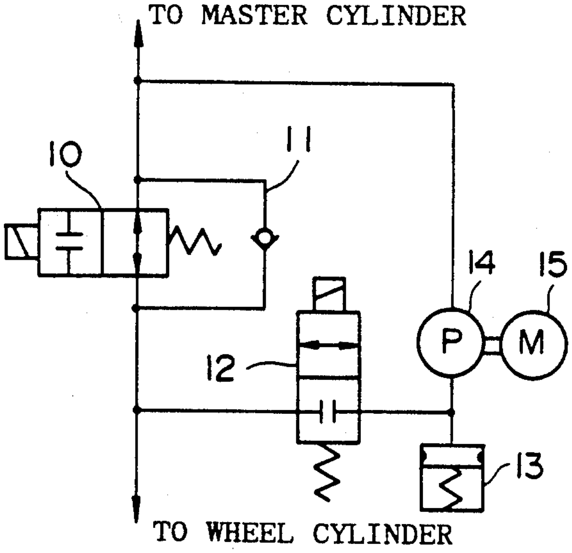
FIG. 5 is a piping diagram showing the constitution of the modulator.

The entire system of the antiskid control apparatus will be explained with reference to FIGS. 4 and 5.

Numeral 1 is a master cylinder, which generates brake fluid pressure by means of the driver's stepping force on the brake pedal 2. This fluid pressure produced by this master cylinder 1 is supplied to the wheel cylinders of the right and left front wheel brakes 4 and 5 through modulators 3 and fluid pressure is also supplied to the wheel cylinders of the right and left rear wheel brakes 7 and 8 through fluid pressure control valves 6. The modulators 3 are provided in the hydraulic system leading to the respective wheel cylinders 4, 5, 7 and 8 perform the functions of controlling the rise in brake fluid pressure or recovering the brake fluid pressure by means of a control signal supplied from the controller 9. The details of the modulators 3 will be described later. The above-mentioned fluid pressure control valves 6 are provided in the hydraulic system leading from the master cylinder 1 to the rear wheel brakes 7 and 8 and limits the fluid pressure in each hydraulic system to a level below that of the fluid pressure in the hydraulic systems for the front wheel brakes 4 and 5. In this way, the front wheels tend to lock taking precedence over the rear wheels during braking. Wheel speed sensors S, that determine the speed of each above-mentioned wheel, are provided in each wheel. A control signal is supplied to modulator 3 from the above-mentioned controller 9 based on the wheel speed data obtained by these wheel speed sensors S Prescribed antiskid control is performed by means of this control signal.

Next, the composition of the embodiment of each of the above-mentioned modulators 3 will be explained according to FIG. 5.

Numeral 10 is a switch valve that can be set to open and closed positions. The hydraulic system leading to each wheel cylinder 4, 5, 7 and 8 from the master cylinder 1 can be opened and closed by means of this switch valve 10 A check valve 11 is attached to the above-mentioned switch valve 10 and allows fluid to flow in the direction toward the master cylinder 1 when the switch valve 10 is in the "closed" position. A switch valve 12 is provided at a position parallel to that of the above-mentioned switch valve 10. This switch valve 12 opens and closes by means of a control signal supplied from the above-mentioned controller 9 to discharge fluid pressure inside wheel cylinders 4, 5, 7 and 8 into reservoir 13.

Numeral 14 indicates a pump that is driven by motor 15. This pump 14 is driven, based on a control signal supplied from the above-mentioned controller 9, to recover the fluid pressure that was reduced in the hydraulic system at the time of antiskid control. By using the above-mentioned configuration, modulator 3 is selectively set at any of the following configuration, a, b, and c.

a. When switch valve 10 is set to "open" and switch valve 12 is set to "closed", modulator 3 is in the increase pressure mode.

b. When switch valve 10 is set to "closed" and switch valve 12 is set to "open", modulator 3 is in the decrease pressure mode.

c. When both switch valve 10 and switch valve 12 are set to "closed", modulator 3 is in the hold mode.

The flow of the fluid in the piping between each wheel cylinder 4, 5, 7 and 8 and master cylinder 1 is controlled in the above-mentioned way.

The antiskid control that performs by means of the above-mentioned controller 9 computes, upon receiving a signal supplied from each wheel speed sensor 8, the wheel speed $R\omega$ or the acceleration $R\omega/dt$ has a negative value during deceleration which is the differential value of the wheel speed. Furthermore, it computes the slip ratio 1 from the above-mentioned wheel speed $R\omega$ and the simulated vehicle speed V, which is obtained from the change curve of wheel speed $R\omega$ during deceleration. For example, based on either acceleration or deceleration $Rd\omega/dt$ and the slip ratio 1, breaking condition as indicated in Table 1 and stated hereafter is applicable to the present braking conditions, modulator 3 is set to the increase pressure mode, decrease pressure mode or hold mode.

In other words, when the slip ratio 1 increases past a prescribed threshold value, or the wheel speed decreases past a prescribed threshold value, the brake fluid pressure decreases, and further, when the slip ratio 1 is below a prescribed threshold value and the wheel speed has a tendency to accelerate, the brake fluid pressure increases.

TABLE 1

| | | | | | |
|---|---|---|---|---|---|
| | | increase pressure | increase pressure | increase pressure | increase pressure |
| | −A | | | | |
| | | increase pressure | increase pressure | hold pressure | increase pressure |
| wheel deceleration | O | | | | |
| | | increase pressure | hold pressure | decrease pressure | decrease pressure |
| | +B | | | | |
| | | hold pressure | decrease pressure | decrease pressure | decrease pressure |

→ slip ratio

As both A and B represent positive values, in the case where deceleration is represented by −A, the wheel speed increases at an acceleration of +A.

When the wheel speed is increasing at an acceleration exceeding a prescribed value A, according to the conditions shown in the above-mentioned Table 1, the brake fluid pressure is raised irrespective of the slip ratio based on the determination that the wheel speed $R\omega$ has a tendency to recover. When the wheel speed falls at a deceleration exceeding a prescribed value B, the decrease pressure mode is selected based on the determination that the wheel speed is approaching a lock condition.

In other words, the suitable mode of operation is selected according to the determination that (See in Table 1) a dangerous condition in which the tendency to lock is developing as designated in the right lower part of the table or a safety condition which departs from the tendency to lock is developing as designated in the upper left part of the table.

In addition, the fluid pressure of the rear-wheel wheel cylinders 7 and 8 can be controlled separately by their respective modulators. However, in this case, the fluid pressure is controlled at an equal level by the "select-low control" that gives fluid pressure priority to the rear wheel which has a tendency to lock.

Figure 1:
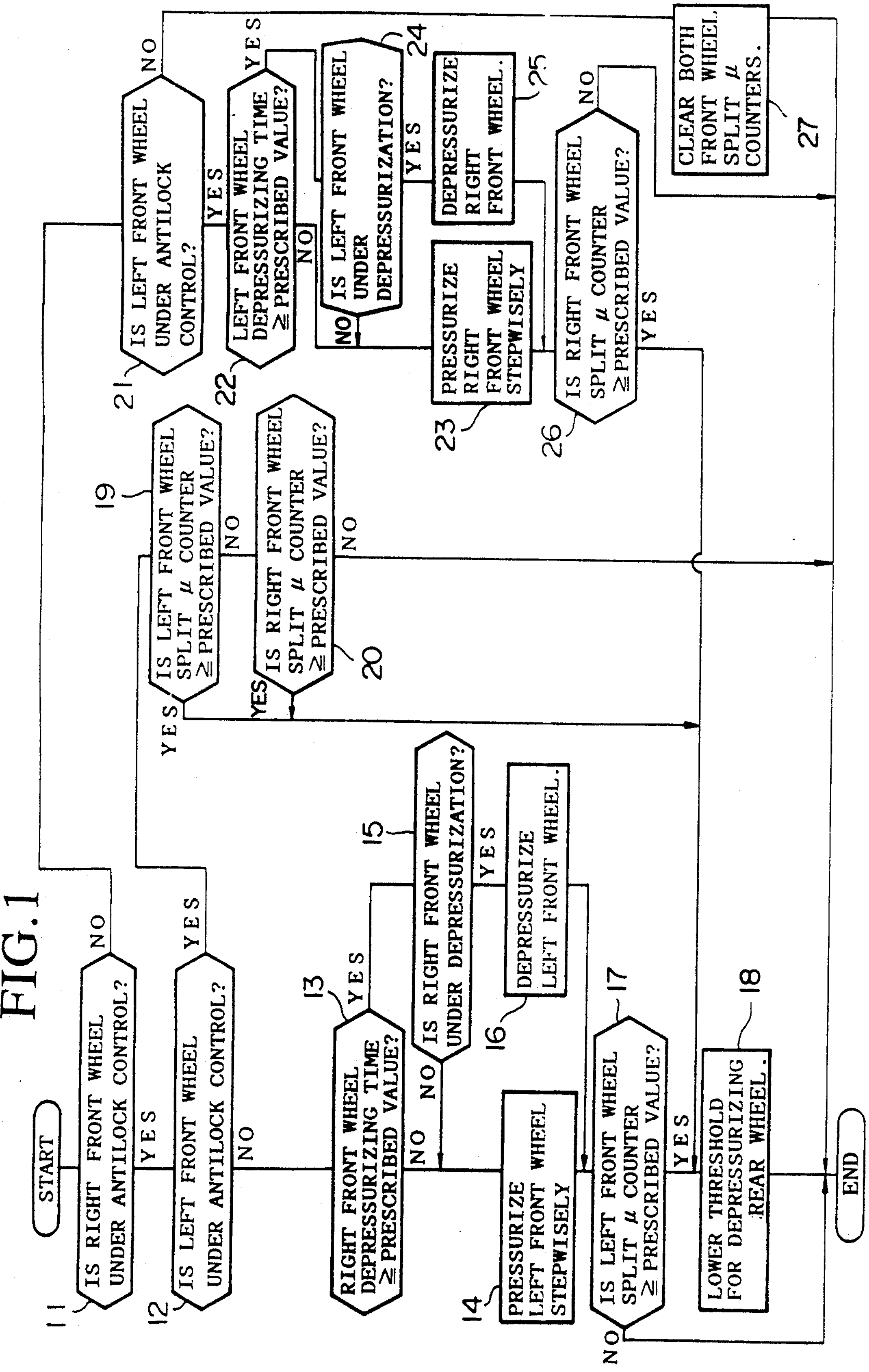
Figure 2A:
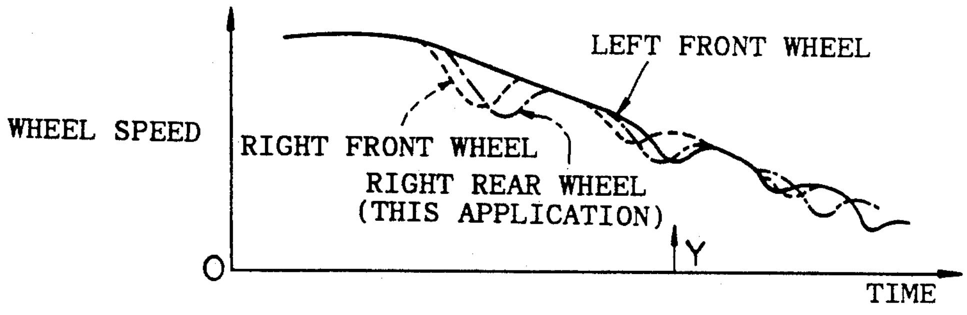
Figure 2B:
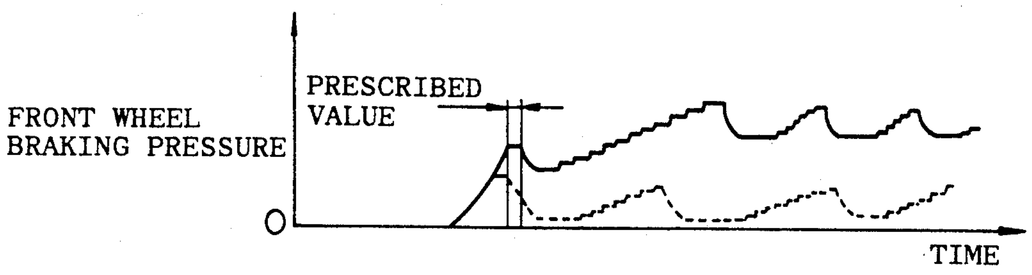
Figure 2C:
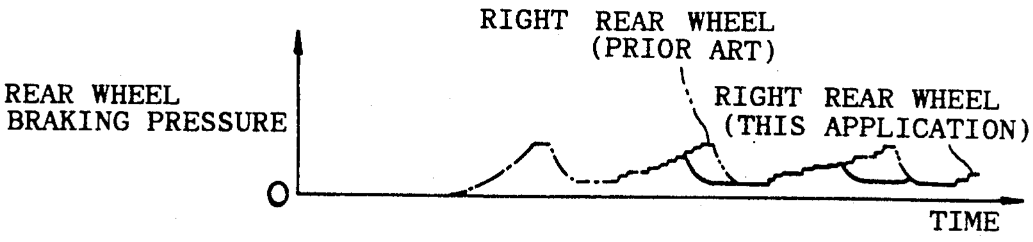
Figure 2D:
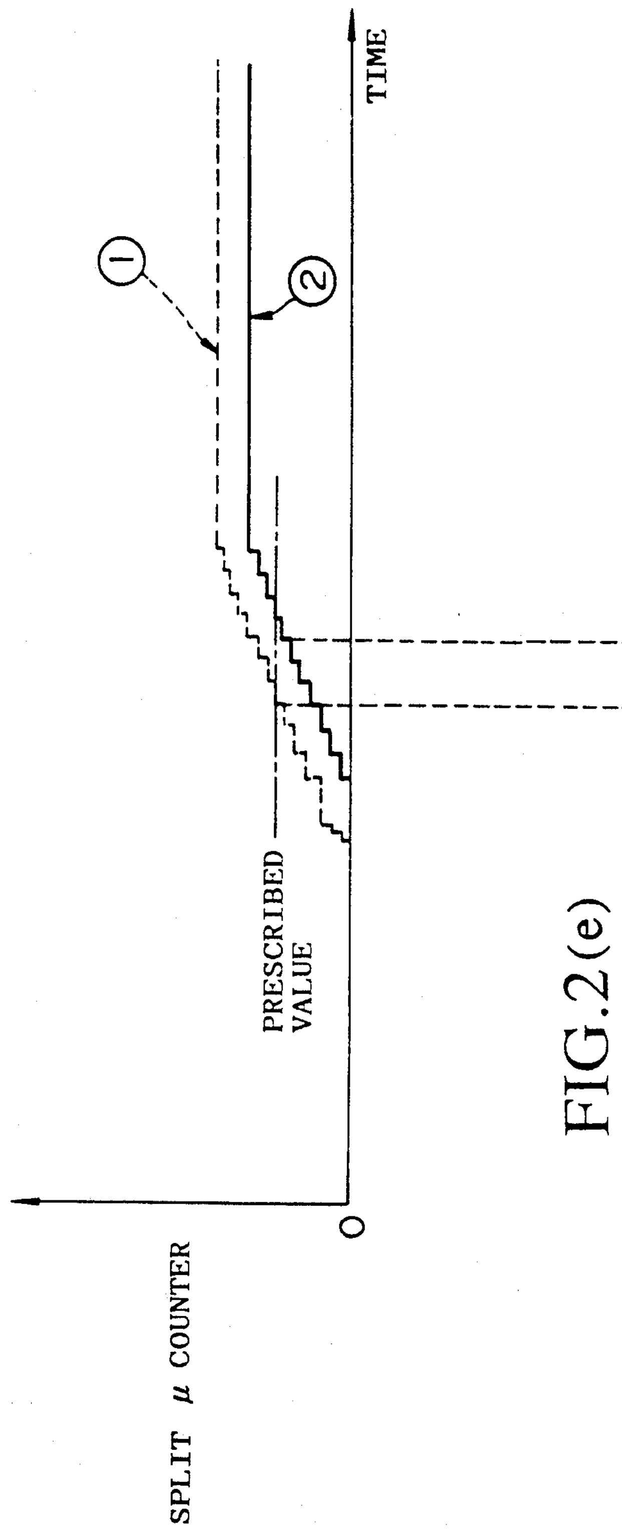
Figure 2E:
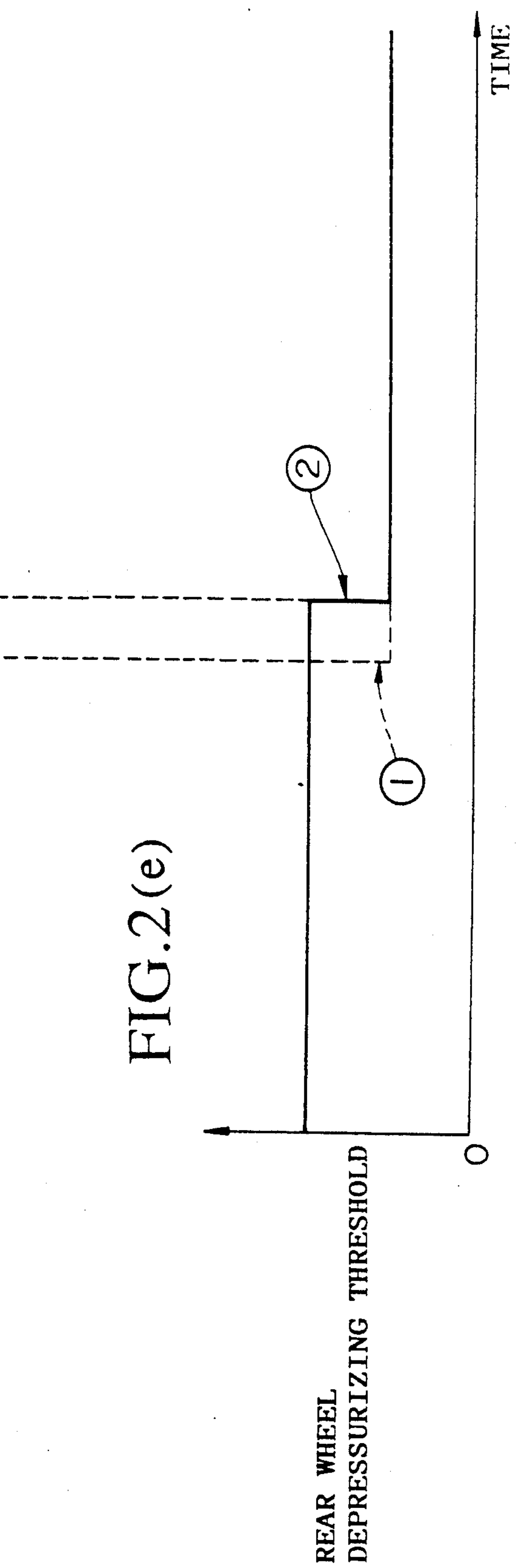

Next how the above-mentioned controller components perform spin countermeasures during braking will be explained with reference to the flowchart shown in FIG. 1.

Step 11

A determination is made as to whether or not one of the front wheels (in this embodiment, the right front wheel) is being antiskid-controlled. In case of "YES" the controller proceeds to step 12. The controller will proceed to step 21 in the case of "NO". The determination as to whether a wheel is being antiskid-controlled or not is carried out for each wheel. When the modulator of one wheel enters into the decrease pressure mode, the flag which indicates that this wheel is being antiskid-controlled is set. The determination is made by checking this flag.

This flag is reset to the initial state by stopping the switch signal by stepping on the brake pedal or when the speed signal stops from the wheel speed sensor S in response to stopping the vehicle. It is permissible to set the under-antiskid-control indicator flag when the controller enters the hold mode as well as the decrease pressure mode.

Step 12

A determination is made whether or not the other front (in this embodiment, the left front wheel) is being antiskid-controlled. In the case of "NO", the controller proceeds to the following step 13; in the case of "YES", the controller proceeds to step 19 described hereinafter.

Step 13

A determination is made as to whether or not the depressurizing period for the right front wheel has exceeded a prescribed value. In the case of "NO", the controller proceeds to step 14; in the case of "YES", it proceeds to step 15. Here, a long depressurizing interval describes a high degree of split $\mu$. The purpose of step 13 is to detect a preliminary value for split $\mu$ and, based on the results, to define the control components for the left front wheel according to the conditions of the right front wheel. Therefore step 13 is called a preliminary determination step based on the consideration of its function.

Step 14

When "NO" is determined in step 13, the switch valve 10 is intermittently opened and closed to pulsively raise the fluid pressure of the left front wheel and thereby lower the increasing rate of braking force of the above-mentioned left front wheel. In addition, when the increasing rate has been lowered, this condition is maintained as it is.

Step 15

When "YES" is determined in step 13, a determination is made as to whether or not the right front wheel is being depressurized. In the case of "NO", the controller proceeds to step 14 and in the case of "YES", it proceeds to the next step 16.

Step 16

The controller proceeds to step 17 after reducing the brake fluid pressure of the left front wheel. This step takes the following matter into consideration. When depressurization continues past a prescribed period of time the controller lowers the difference between the braking forces of two wheels by forcibly depressurizing the left front wheel which is not antiskid-controlled. The function included in both this step 16 and the above-mentioned step 14 is called brake suppressor.

Step 17

A determination is made as to whether or not the split $\mu$ counter of the left front wheel has exceeded a prescribed value. In the case of "YES", the controller proceeds to the next step 18 and in the case of "NO", control stops.

Values in the split $\mu$ counter can be obtained counting the number of pulses while the fluid pressure is increasing as in step 14 or by totaling the number and the depressurizing time in step 16 in terms of the count value which is obtained by using a prescribed conversion factor, such as a certain span of time, for example, 5 ms, per one count. Then a determination is made as to whether or not the count has exceeded a prescribed value. The split $\mu$, which means that the coefficient for the friction of the road surface is different between the right and left wheels, is detected by when the count exceeds a prescribed value. This function is called split $\mu$ detector.

Step 18

The threshold value (of the slip ratio and/or wheel deceleration) when depressurizing the real wheel for antiskid control. When the threshold value has been previously lowered, the value is maintained as in the previous step. The function of this step 18 is called a threshold value changing step.

Step 19

While the above-mentioned steps 13–17 are constituted such that a determination can be made as to whether the threshold value when depressurizing the rear wheel in the first cycle of antiskid control must be lowered is made in step 17. If the value is lowered in step 18, this step 19 and the succeeding step 20 are necessary to determine whether or not to lower the threshold value in the cycle for the left front wheel during antiskid control.

In step 19, a determination is made as to whether the split $\mu$ counter of the left front wheel has exceeded a prescribed value and in case of "YES", the controller proceeds to step 18 while, in case of "NO", the controller proceeds to the succeeding step 20. When step 19 provides the same determination that the split $\mu$ counter has exceeded a prescribed value made in step 17, the controller proceeds to step 18. When a determination that the split $\mu$ counter has not exceeded the prescribed value is made in step 17, the controller proceeds to step 20 for the same reason as in step 19.

Step 20

Contrary to step 19, a determination is made as to whether the split $\mu$ counter of the right front wheel has exceeded a prescribed value. In the case of "YES", the controller proceeds to step 27 as will be explained later. In the case of "NO", one control cycle is finished.

Step 21

When the right front wheel is not undergoing antiskid control, a determination is made as to whether or not the left front wheel is undergoing antiskid control. In the case of "YES", the controller proceeds to step 22 to provide the right front wheel with the same control as described in the above-mentioned steps 13-18. In the case of "NO", the controller proceeds to step 28.

Step 22

A determination is made as to whether the depressurizing time of the left front wheel has exceeded a prescribed value. In the case of "NO", the controller proceeds to step 23 and, in the case of "YES", to step 24.

Step 23

By pulsively raising the brake fluid pressure of the left front wheel, the increasing speed of the braking force for the right front wheel is lowered. In addition, when the increasing speed of the braking force has been previously lowered, this setting is maintained as it is.

Step 24

A determination is made as to whether the brake is being depressurized. In the case of "NO", the controller proceeds to step 23 and in the case of "YES", to the next step 26.

Step 25

The brake fluid pressure of the right front wheel is reduced.

Step 26

A determination is made as to whether or not the split $\mu$ counter of the right front wheel has exceeded a prescribed value. In the case of "YES", the controller proceeds to the next step 27 and in the case of "NO" the control cycle is finished.

Step 27

The split $\mu$ counters of the right and left wheels are cleared.

Step 28

The split $\mu$ counters of both the right and left wheels are cleared.

Next, the behavior of an antiskid-controlled vehicle under the conditions of split $\mu$ where the coefficients of friction between the right and left wheels differ from each other is explained with reference to FIG. 6. The road surface conditions shown in FIG. 6 are such that the right side of the road surface is low $\mu$ (for example, an icy road) and the left side is high $\mu$ (for example, a dry asphalt road).

In a conventional antiskid control that controls the rate of the increase in the braking power of the front wheel on the opposite side of one of the front wheels which is undergoing antiskid control, and when the antiskid control is started by detecting an abrupt reduction of the wheel speed of the right front wheel as shown FIG. 6(*b*), the brake fluid pressure of the left front wheel is gradually increased in a stepwise form, as shown by numeral 31, to lower the rate of the increase in the braking force. However, in the right front wheel and right rear wheel, the brake pressure rises at a high speed in accordance with the pressure on the brake pedal 2 as shown in FIGS. 6(*b*) and (*c*), resulting in a strong slipping tendency as shown in FIG. 6(*a*).

In general, a relationship exists between the tires and the road surface as shown in FIG. 7. The coefficient of friction (road surface $\mu$) in the direction of the motion of a tire reaches a peak value in the range where the slip ratio is 0.05 to 0.3, but the friction coefficient (hereinafter called sideforce coefficient) in the direction perpendicular to the rolling direction of the tire tends to gradually decrease as the slip ratio 1 increases. Accordingly, at the time point of X in FIG. 6, the braking force as indicated by the arrows 40*a*, 40*b*, 40*c* and 40*d* (appended letters of a to d indicate the left front-, right front- left rear-, and right rear wheels respectively) in FIG. 8 are generated in each wheel. These forces 40*a* to 40*d* working generate a yaw moment shown by arrow 41 near the center of gravity 42 of a vehicle. When the moment formed by the side forces (shown by arrows 43*a* to 43*d* in FIG. 8) is not sufficient to oppose this yaw moment, the vehicle will spin. However, the conventional control system shown in FIG. 6 which only delays the rise in brake fluid pressure of the wheel on the side not being antiskid controlled only delays the generation of the moment as shown by arrow 41. Hence, if the proper operation is not executed by the time this moment is generated, spin may occur. The possibility of spin is particularly high in compact vehicles because the wheelbase of these vehicles is short and the absolute value of friction of the wheels against the road surface is small due to a small load on the rear wheels, and accordingly, the side forces shown by arrows 43*c* and 43*d* are too weak to cope with the yaw moment 41.

On the contrary, in the control system of the present embodiment, when the right or left front wheel starts to be antiskid-controlled and its depressurizing time exceeds a prescribed value, the other front wheel on the side opposite the wheel under antiskid control is pulsively pressurized or depressurized to decrease the difference in the braking forces of the two wheels in response to the control conditions of the wheel under antiskid control.

If the forced control of the other front wheel continues for a prescribed period of time, that is, when the split $\mu$ counter has exceeded a prescribed count value, it is determined whether the split $\mu$ exists or the wheel has a high $\mu$, and then the threshold value when depressurizing the rear wheel in the antiskid control is lowered to promote the start of antiskid control. Consequently antiskid control can be easily applied to the right rear wheel. Furthermore, even after antiskid control of the other front wheel is initiated, when the split $\mu$ counter of each front wheel exceeds a prescribed value, the threshold value when depressurizing the rear wheel is lowered or left as is (when the threshold has been previously been lowered) to lower the braking power of the rear wheel continuously during antiskid control. In other words, although conventional control increases the brake pressure in the right rear wheel (as shown by a broken line in FIG. 2(*c*)), control according to this application suppresses this increase (as shown by a solid line), thus facilitating antiskid control and decreasing braking power.

This process may be explained in terms of the threshold value of the slip ratio. When the threshold value shown by A' in FIG. 7 is used in the control, the control region of the vehicle is (3) as a result of overshooting due to the inertia of the vehicle. However, when the threshold value is changed to B', the control region is changed to region (4). Thus, after the time indicated by mark Y in FIG. 2, the braking force of the rear wheel is lowered as shown by mark 44c and 44d in FIG. 8 (a dotted and dashed line), yielding a yaw moment (45) smaller than the previous yaw moment (41) and making it difficult for a vehicle to spin. Meanwhile, since the side force coefficient is increased by the change of threshold from A' to B', the side force of each rear wheel is strengthened as shown by marks 46c and 44d, and furthermore it can cancel the yaw moment (45).

As described above, the threshold value can be changed in order to reduce the braking force of the rear wheel and increase the side force in consideration of the inertia of the vehicular system, and the side force and braking force can be set so as to equally or a little more increase.

Figure 3A:
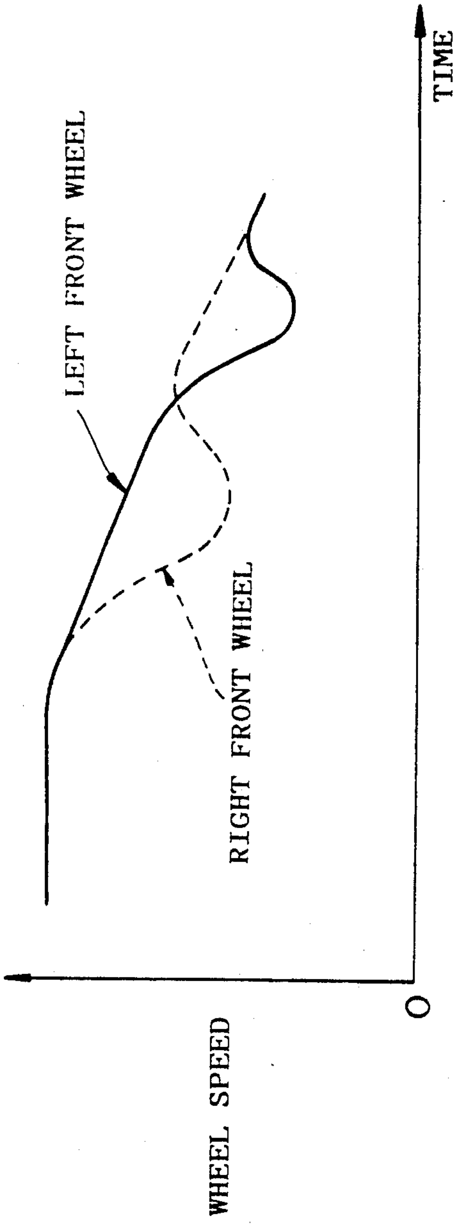
Figure 3B:
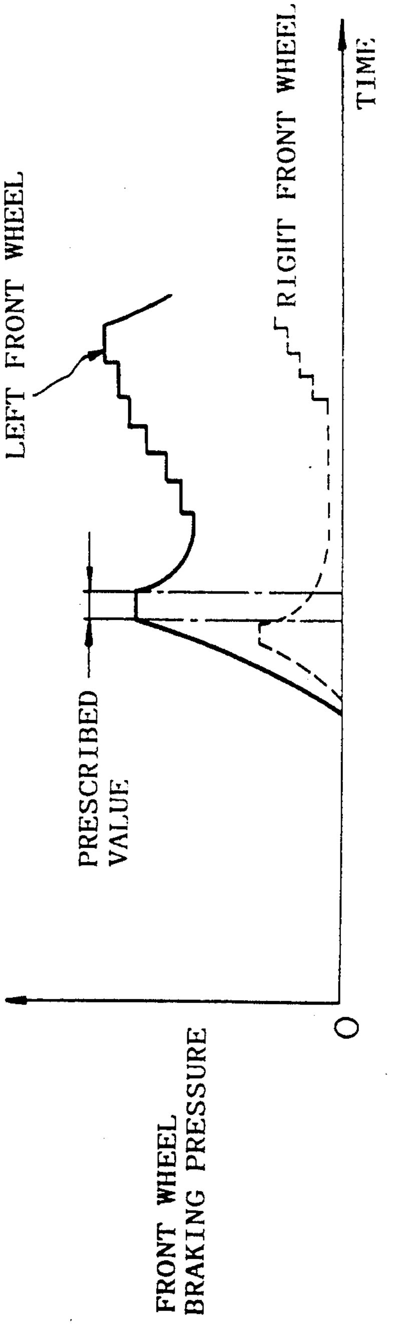
Figure 3C:
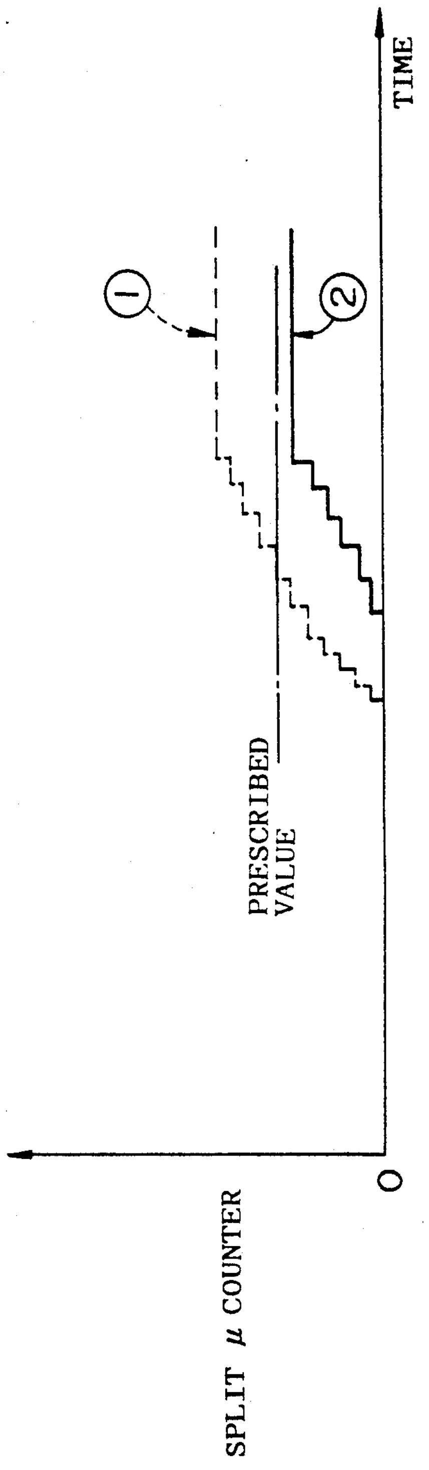
Figure 3D:
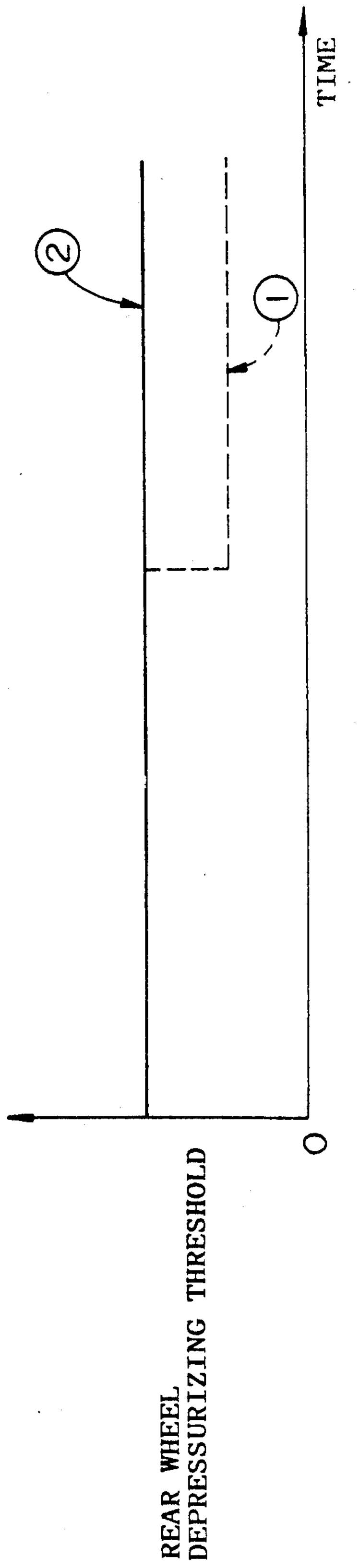

In consideration of inertia of the vehicular system, the threshold value can be changed as described above so as to reduce the braking force of the left front wheel and increase the side force. The braking force can be made equal to or greater than the side force. The split μ counter may be applied to two kinds of measurements. One counts the number of pulses that increment the brake fluid pressure as indicated by (2), and the other counts the sum of the above-mentioned increments and the depressurizing time in terms of the increments indicated by (2). Whereas the split μ counter cannot detect split μ in some cases where the counter or does not exceed the prescribed value as shown in FIG. 3(c).

Second Embodiment

The flow chart of the second embodiment of this invention is shown in FIG. 9. Only differences from FIG. 1 will be explained.

Step 51

The split μ counter of the right front wheel is cleared.

Step 52

The threshold value for depressurizing the rear wheel in the fist cycle is decreased for antiskid control of the left front wheel.

Step 53

The threshold for depressurizing the rear wheel in the usual cycle is decreased for antiskid control of the left front wheel.

Step 54

The split μ counter of the left front wheel is cleared. Thus, whereas the amount that depressurization will be decreased in the antiskid control of the rear wheel must be identical when the lowering is determined in the first cycle and the usual cycles in the first embodiment, the amount to be lowered can be separately set for the first cycle and usual cycle. Consequently, by further decreasing the threshold value in depressurization for the first cycle, earlier antiskid control can be initiated.

Step 55

The split μ counter of the left front wheel is cleared.

Step 56

The threshold value in the depressurization of the first cycle is lowered in the right front wheel.

Thus, whereas the amount to be lowered in depressurization in antiskid control is set identical in both cases where the lowering is determined in the first cycles and the usual cycles in the first embodiment, the amount to be lowered can be set separately in the cases of the first cycle and the usual cycle. Consequently, by giving a larger setting to the amount to be lowered in the threshold value in depressurization for the first cycle, antiskid control can be initiated earlier.

The Third Embodiment

The third embodiment of the present invention is shown in FIGS. 10-12, and only its differences from the first embodiment are explained with new marks.

The flowchart in FIG. 10 includes the following steps.

Step 61

The threshold value for depressurizing the left front and rear wheels is lowered for antiskid control. If previously lowered, the threshold does not change.

Step 62

The threshold value for depressurizing the right front and rear wheels is lowered.

In other words, in this embodiment, when either the right or left front wheel becomes subject to antiskid control, the threshold value will be lowered for the other front wheel as well as for the rear wheels. This can be explained by applying the slip threshold in depressurization as follows. When the threshold value is changed from A' to B' in FIG. 7, the braking power is diminished for the left front wheel as well as for the rear wheels as shown by 63a in FIG. 12. This changes the yaw moment (41) to a diminished yaw moment (64) and reduces the possibility of the vehicle spinning. Moreover, the side forces, increased by the change of threshold from A' to B' as shown by FIG. 12 65a to 65c, can cancel the yaw moment.

The Fourth Embodiment

FIG. 13 shows the fourth embodiment of the present invention. This embodiment sets the amount of decrease in the threshold in the first cycle of antiskid control differently from the amount of decrease in the usual cycle (as in the second embodiment) compared with the third embodiment shown in FIG. 10. Earlier antiskid control can be started by further decreasing the threshold for depressurizing in the first cycle.

Only those components that differ from the flowchart of FIG. 10 are explained hereunder with new marks.

Step 71

The split μ counter of the right front wheel is cleared.

Step 72

In the first cycle of antiskid control of the left front wheel, the threshold for depressurizing the left front and rear wheels is lowered.

Step 73

In the usual cycle of antiskid control of the left front wheel, the threshold for depressurizing the left front and rear wheels is lowered.

Step 74

The threshold for depressurizing the left front and rear wheels is lowered in the usual cycle of antiskid control.

Step 75

The split $\mu$ counter of the left front wheel is cleared.

Step 76

In the first cycle of antiskid control of the right front wheel, the threshold for depressurizing the right wheel and rear wheels is lowered.

Modified Embodiment (1) It may be possible to control the rear wheels in a similar way to the front wheel on the low $\mu$ side so as to reduce the braking power and side forces on the rear wheel sides.

(2) In the above-mentioned embodiments, an explanation is given of the case where switching is made between "increase pressure", "hold" and "decrease pressure" in accordance with the condition in Table 1. Needless to say, this invention can be used for switching conditions other than those mentioned above. As for the threshold value, the purpose is ensure the prescribed side force can be accomplished in both cases where either the threshold value of wheel deceleration or slip ratio (or its absolute amount) shown in the Table 1 are lowered. In this case, for example, the threshold values giving the criteria of each mode selection in Table 1 are converted to those shown in Tables 2–4 below.

TABLE 2

| | | | | | |
|---|---|---|---|---|---|
| | | increase pressure | increase pressure | increase pressure | increase pressure |
| | −A | | | | |
| | | increase pressure | increase pressure | hold pressure | decrease pressure |
| wheel deceleration | O | | | | |
| | | increase pressure | hold pressure | decrease pressure | decrease pressure |
| | +B | | | | |
| | | hold pressure | decrease pressure | decrease pressure | decrease pressure |

→ slip ratio

TABLE 3

| | | | | | |
|---|---|---|---|---|---|
| | | increase pressure | increase pressure | increase pressure | increase pressure |
| | −A | | | | |
| | | increase pressure | increase pressure | hold pressure | decrease pressure |
| wheel deceleration | O | | | | |
| | | increase pressure | hold pressure | decrease pressure | decrease pressure |
| | +B | | | | |
| | | hold pressure | decrease pressure | decrease pressure | decrease pressure |

→ slip ratio

TABLE 4

| | | | | | |
|---|---|---|---|---|---|
| | | increase pressure | increase pressure | increase pressure | increase pressure |
| | −A | | | | |
| | | increase pressure | increase pressure | hold pressure | decrease pressure |
| wheel deceleration | O | | | | |
| | | increase pressure | hold pressure | decrease pressure | decrease pressure |
| | +B | | | | |
| | | hold pressure | decrease pressure | decrease pressure | decrease pressure |

→ slip ratio

In Table 2, the threshold values for entry to the decrease pressure mode are set low, and entry itself is thereby facilitated for both wheel deceleration and slip ratio. Also in Tables 3 and 4, the same principles apply regarding slip ratio and wheel deceleration, respectively.

Since, in Table 2, the threshold value conditioned on entry into the decrease mode is set low, the condition on entry to the decrease mode is available regarding both wheel deceleration and slip ratio.

Since in Table 3 the threshold value for slip ratio is set low, the conditions on entry to the decrease pressure mode is available for this slip ratio.

Since also in Table 4 he threshold value for the wheel deceleration is set low, the conditions on entry to wheel deceleration is mitigated regarding this wheel deceleration.

(3) While, in the above-mentioned embodiment, the threshold value in depressurization is set low in steps 18, 27, etc. in order to lower the braking force, this objective can be realized by adopting some means of decreasing the braking power in the rear wheel, by, for example, slight synchronized depressurization for the rear wheel with depressurization of the front wheel that is subject to antiskid control, forced depressurization of the rear wheel whenever a prescribed period of time has passed, depressurization of the rear wheel so that the computed value of wheel deceleration does not exceed a prescribed value, delaying the end of depressurization of the rear wheel, etc.

(4) In the above-mentioned embodiment, the threshold in depressurization is set low in steps 18 and 27 so as to lower the difference between braking forces. This may be achieved by lowering the braking power on the high $\mu$ side using some method of braking power control such as slight depressurization for the wheel on the high $\mu$ side synchronized with the depressurization of the wheel on the low $\mu$ side under antiskid control; forced depressurization of the high $\mu$ side every time a prescribed period of time passes; depressurization of the wheel on the high $\mu$ side so that the computed value of the wheel deceleration does not exceed a prescribed value; or delaying the stop of depressurization of the wheel on the high $\mu$ side.

(5) It is possible that only the number of counts in the depressurizing period in steps 16, 25, etc., is counted or the condition of split $\mu$ is detected depending on the presence or absence of depressurization control in these steps.

(6) While explanation was given on the select-low control of rear wheels in the above-mentioned embodiments, the control in accordance with this invention is, of course, effective in the case of no select-low control.

What is claimed is:

1. An anti-skid control apparatus for a vehicle braking system having front wheels, rear wheels, and a brake system for optionally exerting braking force on the wheels wherein brake fluid is employed to transmit the braking force, the anti-skid control apparatus comprising:

a) wheel speed sensors for measuring speed of the wheels respectively, b) a modulator for selecting a mode for each of the wheels, the mode being selected out of an increase pressure mode, and at least one of a decrease pressure mode and a hold mode, the increase pressure mode is for increasing brake fluid pressure, the decrease pressure mode is for decreasing the brake fluid pressure, and the hold mold is for maintaining the pressure, c) a controller for judging, with reference to threshold values, whether a wheel is about to lock based on wheel speeds, and when a wheel is about to lock, activating anti-skid control for the wheel which is about to lock, by controlling the selection of modes at the modulator so that one of the hold mold and the pressure decrease mode is selected for the wheel which is about to lock, the controller having;

a pressure suppression means for stepwisely increasing in pressure increments the brake fluid pressure of a front wheel which is not under the anti-skid control in the condition when the other front wheel is under anti-skid control, a split $\mu$ detection means for counting the number of said pressure increments, and determining that a split $\mu$ state exists when the number of increments exceeds a prescribed value, the split $\mu$ state being defined as a condition when the difference between the friction coefficients of the surface beneath the right and left wheels exceeds a predetermined value, and a braking force decreasing means for decreasing the braking force on the rear wheels, during the anti-skid control of the other front wheel and in the split $\mu$ state.

2. An anti-skid control apparatus in accordance with claim 1, wherein the braking force decreasing means decreases the brake fluid pressure of the rear wheels, in synchronism to the decrease of the brake fluid pressure of the front wheel under anti-skid control.

3. An anti-skid control apparatus in accordance with claim 1, wherein the braking force decreasing means decreases the braking force of the front wheel which is not under anti-skid control together with the rear wheels.

4. An anti-skid control apparatus for a vehicle braking system having front wheels, rear wheels, and a brake system for optionally exerting braking force on the wheels wherein brake fluid is employed to transmit the braking force, the anti-skid control apparatus comprising:

a) wheel speed sensors for measuring speed of the wheels respectively;

b) a modulator for selecting a mode for each of the wheels, the mode being selected out of an increase pressure mode, and at least one of a decrease pressure mode and a hold mode, the increase pressure mode is for increasing brake fluid pressure, the decrease pressure mode is for decreasing the brake fluid pressure, and the hold mode is for maintaining the pressure, c) a controlling for judging, with reference to threshold values, whether a wheel is about to lock based on wheel speeds, and when a wheel is about to lock, activating anti-skid control for the wheel which is about to lock, by controlling the selection of modes at the modulator so that one of the hold mode and the pressure decrease mode is selected for the wheel which is about to lock, the controller having:

a preliminary judgment means for counting a duration of decreasing pressure mode for a front wheel which is under the anti-skid control in the condition when the other front wheel is not under anti-skid control, and judging whether the duration exceeds a predetermined time, a pressure suppression means for decreasing the brake fluid pressure of the front wheel which is not under anti-skid control even when the duration of the decreasing pressure mode exceeds the predetermined time if the brake fluid pressure of the front wheel under anti-skid control is still being decreased, a split $\mu$ detection means for counting the duration of the pressure decrease, performed by means of the pressure suppression means, and determining that a split $\mu$ state exists when the duration of the pressure decrease exceeds a prescribed value, the split $\mu$ state being defined as a condition when the difference between the friction coefficients of the surface beneath the right and left wheels exceeds a predetermined value, and a braking force decreasing means for decreasing the brake force on the rear wheels, during the anti-skid control of the front wheel and in the split $\mu$ state.

5. An anti-skid control apparatus in accordance with claim 4, wherein the braking force decreasing means decreases the brake fluid pressure of the rear wheels, in synchronism to the decrease of the brake fluid pressure of the front wheel under anti-skid control.

6. An anti-skid control apparatus in accordance with claim 4, wherein the braking force decreasing means decreases the braking force of the front wheel which is not under anti-skid control together with the rear wheels.

7. An anti-skid control apparatus in accordance with claim 4, wherein the pressure suppression means further stepwisely increases in pressure increments the brake fluid pressure of the front wheel which is not under anti-skid control, when the brake fluid pressure of the front wheel, which is not under anti-skid control, is not decreased by means of the pressure suppression means, the split $\mu$ detection further counts the number of said pressure increments, adds the number of pressure increments to the duration of the pressure decrease, performed by means of the pressure suppression means, and determines that the split $\mu$ state exists when the total of the number and the duration exceeds said predetermined value.

8. An anti-skid control apparatus for a vehicle braking system having front wheels, rear wheels, and a brake system for optionally exerting braking force on the wheels wherein brake fluid is employed to transmit the braking force, the anti-skid control apparatus comprising:

a) wheel speed sensors for measuring speed of the wheels respectively, b) a modulator for selecting a mode for each of the wheels, the mode being selected out of an increase pressure mode, and at least one of a decrease pressure mode and a hold mode, the increase pressure mode is for increasing brake fluid pressure, the decrease pressure mode is for decreasing the brake fluid pressure, and the hold mold is for maintaining the pressure, c) a controller for judging, with reference to threshold values, whether a wheel is about to lock based on wheel speeds, and when a wheel is about to lock, activating anti-skid control for the wheel which is about to lock, by controlling the selection of modes at the modulator so that one of the hold mold and the pressure decrease mode is selected for the wheel which is about to lock, the controller having:

a pressure suppression means for stepwisely increasing in pressure increments the brake fluid pressure of a front wheel which is not under the anti-skid control in the condition when the other front wheel is under anti-skid control, a split μ detection means for counting the number of said pressure increments, and determining that a split μ state exists when the number of increments exceeds a prescribed value, the split μ state being defined as a condition when the difference between the friction coefficients of the surface beneath the right and left wheels exceeds a predetermined value, and a threshold value changing means for changing the threshold value corresponding to the rear wheels, during the anti-skid control of the front wheel and in the split μ state, so that either one of the decrease pressure mode and the hold mold is activated easily for the rear wheels.

9. An anti-skid control apparatus in accordance with claim 8, wherein the threshold value changing means changes the threshold value for judging whether to enter into the decrease pressure mode.

10. An anti-skid control apparatus in accordance with claim 9, wherein the threshold value changing means maintains, during the anti-skid control, the changed threshold value at the start of anti-skid control.

11. An anti-skid control apparatus in accordance with claim 9, wherein the change in the threshold value when the anti-skid control is initiated is different from the change in the threshold value after initiation of the anti-skid control.

12. An anti-skid control apparatus in accordance with claim 8, wherein the threshold value changing means changes the threshold value for judging whether to enter into the hold mode.

13. An anti-skid control apparatus in accordance with claim 8, wherein the threshold value changing means changes the threshold value corresponding to the front wheel which is not under the anti-skid control together with the rear wheels, so that either one of the decrease pressure mode and the hold mode is activated easily for the front wheel.

14. An anti-skid control apparatus for a vehicle braking system having front wheels, and a brake system for optionally exerting braking force on the wheels wherein brake fluid is employed to transmit the braking force, the anti-skid control apparatus comprising:

a) wheel speed sensors for measuring speed of the wheels respectively, b) a modulator for selecting a mode for each of the wheels, the mode being selected out of an increase pressure mode, and at least one of a decrease pressure mode and a hold mode, the increase pressure mode is for increasing brake fluid pressure, the decrease pressure mode is for decreasing the brake fluid pressure, and the hold mold is for maintaining the pressure, c) a controller for judging, with reference to threshold values, whether a wheel is about to lock based on wheel speeds, and when a wheel is about to lock, activating anti-skid control for the wheel which is about to lock, by controlling the selection of modes at the modulator so that one of the hold mold and the pressure decrease mode is selected for the wheel which is about to lock, the controller having:

a preliminary judgment means for counting a duration of decreasing pressure mode for a front wheel which is under the anti-skid control in the condition when the other front wheel is not under anti-skid control, and judging whether the duration exceeds a predetermined time, a pressure suppression means for decreasing the brake fluid pressure of the front wheel which is not under anti-skid control even when the duration of the decreasing pressure mode exceeds the predetermined time if the brake fluid pressure of the front wheel under anti-skid control is still being decreased, a split μ detection means for counting the duration of pressure decrease, performed by means of the pressure suppression means, and determining that a split μ state exists when the duration of the pressure decrease exceeds a prescribed value, the split μ state being defined as a condition when the difference between the friction coefficients of the surface beneath the right and left wheels exceeds a predetermined value, and a threshold value changing means for changing the threshold value corresponding to the rear wheels, during the anti-skid control of the front wheel and in the split μ state, so that either one of the decrease pressure mode and the hold mode is activated easily.

15. An anti-skid control apparatus in accordance with claim 14, wherein the threshold value changing means changes the threshold value for judging whether to enter into the decrease pressure mode.

16. An anti-skid control apparatus in accordance with claim 15, wherein the threshold value changing means maintains, during the anti-skid control, the changed threshold value at the start of anti-skid control.

17. An anti-skid control apparatus in accordance with claim 15, wherein the change in the threshold value when the anti-skid control is initiated is different from the change in the threshold value after initiation of the anti-skid control.

18. An anti-skid control apparatus in accordance with claim 14, wherein the threshold value changing means changes the threshold value for judging whether to enter into the hold mode.

19. An anti-skid control apparatus in accordance with claim 14, wherein the threshold value changing means changes the threshold value corresponding to the front wheel which is not under anti-skid control together with the rear wheels, so that either one of the decrease pressure mode and the hold mode is activated easily for the front wheel.

20. An anti-skid control apparatus in accordance with claim 14, wherein the pressure suppression means further stepwisely increases by pressure increments the brake fluid pressure of the front wheel which is not under anti-skid control, when the brake fluid pressure of the front wheel which is not under anti-skid control is not decreased by means of the pressure suppression means, the split μ detection further counts the number of pressure increments, adds the number of pressure increments to the duration of the pressure decrease, performed by means of the pressure suppression means, and determines that the split μ state exists when the total of the number and the duration exceeds said prescribed value.

* * * * *